(12) United States Patent
Tecza et al.

(10) Patent No.: US 9,212,665 B2
(45) Date of Patent: *Dec. 15, 2015

(54) PLANETARY-TYPE AUXILIARY BEARING FOR A HYDROSTATIC PRIMARY BEARING

(71) Applicant: Dresser-Rand Company, Olean, NY (US)

(72) Inventors: Joseph A. Tecza, Scio, NY (US); Timothy R. Griffin, Allegany, NY (US); H. Niklas Sehlstedt, Olean, NY (US); William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/987,328

(22) Filed: Apr. 8, 2013

(65) Prior Publication Data

US 2014/0301680 A1 Oct. 9, 2014

(51) Int. Cl.
| | |
|---|---|
| *F16C 19/50* | (2006.01) |
| *F04D 29/057* | (2006.01) |
| *F04D 29/059* | (2006.01) |
| *F04D 17/12* | (2006.01) |
| *F16C 39/02* | (2006.01) |
| *F16C 13/04* | (2006.01) |
| *F16C 32/06* | (2006.01) |

(52) U.S. Cl.
CPC ............ *F04D 29/057* (2013.01); *F04D 17/122* (2013.01); *F04D 29/059* (2013.01); *F16C 13/04* (2013.01); *F16C 19/507* (2013.01); *F16C 32/06* (2013.01); *F16C 39/02* (2013.01); *Y10T 29/49679* (2015.01)

(58) Field of Classification Search
CPC .............................. F16C 19/50; F16C 19/507
USPC ......................................... 384/101, 102, 549
See application file for complete search history.

(56) References Cited

U.S. PATENT DOCUMENTS

| | | | | | |
|---|---|---|---|---|---|
| 2,926,974 | A | * | 3/1960 | Anderson et al. ............. | 384/549 |
| 3,836,103 | A | * | 9/1974 | Retali et al. .................. | 248/130 |
| 4,160,569 | A | * | 7/1979 | Reid .............................. | 384/549 |
| 4,542,994 | A | * | 9/1985 | Mohsin ......................... | 384/101 |
| 4,605,320 | A | * | 8/1986 | Gossner ........................ | 384/494 |
| 5,021,697 | A | * | 6/1991 | Kralick ........................ | 310/90.5 |
| 5,044,786 | A | * | 9/1991 | Jacob et al. .................. | 384/549 |
| 5,272,403 | A | * | 12/1993 | New ............................. | 310/90.5 |
| 5,345,127 | A | * | 9/1994 | New ............................. | 310/90.5 |

* cited by examiner

*Primary Examiner* — Thomas R. Hannon
(74) *Attorney, Agent, or Firm* — Edmonds & Nolte, P.C.

(57) ABSTRACT

A rotor system for a rotating machine, including a rotating shaft, an auxiliary bearing, and a primary bearing configured to provide a bearing and seal combination. The auxiliary bearing may include a support structure extending around a circumference of the rotating shaft, such that an annular gap is defined between the support structure and the rotating shaft when the primary bearing supports the rotating shaft. The auxiliary bearing may also include a first pedestal extending radially-inward from the support structure, and first and second beams extending from opposite sides of the first pedestal in a plane perpendicular to an axis of the shaft. The auxiliary bearing may further include a first roller operatively coupled to the first beam, and a second roller operatively coupled to the second beam, such that the first and second rollers are configured to engage the shaft.

20 Claims, 8 Drawing Sheets

PLANETARY-TYPE AUXILIARY BEARING FOR A HYDROSTATIC PRIMARY BEARING

CROSS-REFERENCE TO RELATED APPLICATIONS

The present application is a continuation-in-part of co-pending U.S. patent application Ser. No. 13/642,767, which was filed on Oct. 22, 2012, which is a United States national application of PCT Application No. PCT/US2011/045987, which was filed on Jul. 29, 2011, which claims priority to U.S. Provisional Patent Application Ser. No. 61/407,550, which was filed Oct. 28, 2010. The priority applications are hereby incorporated by reference in their entirety into the present application to the extent they are consistent with the present disclosure.

BACKGROUND

Bearings may be used in rotating machines to support the rotor in both axial and radial directions. Such bearings may include, for example, lubricated, magnetic, hydrostatic, and gas-dynamic bearings. These bearings generally require a longer rotary shaft and may, in the case of at least magnetic bearings, require complex and costly control systems. In addition to the bearings, the rotating machines, e.g., compressors, typically utilize shaft seals about the rotary shaft to prevent the leakage of process fluid from the housing in which the compressor is disposed. However, the disposition of the shaft seals about the rotary shaft in addition to the aforementioned bearings typically further adds to the required length of the rotary shaft. Generally, a longer rotary shaft increases the weight of the rotor and may reduce the rotor-dynamic performance.

Moreover, in the case of hydrostatic bearings, if the source of pressure for the operation of the hydrostatic bearing is within the turbomachine (i.e., compressor impellers), that pressure may be a function of rotor speed, typically, the square of the speed. Accordingly, the ability of the bearing to support load, e.g., the rotor weight, drops-off rapidly with speed as the pressure differential across the bearing decays, and the bearing may cease to operate when the load capacity falls below the local weight of the shaft system. This may happen at a relatively high speed because the pressure differential falls faster than rotor speed.

In such cases, a system such as a passive permanent magnet system may be utilized to support some amount of the rotor load and allow the bearing to operate at a lower speed, that is, with a reduced pressure differential. However, the passive permanent magnet system may not have the load capacity necessary to support the rotor down to standstill. Accordingly, additional support may be provided by stationary pads that tolerate some rubbing of the rotor, or by an auxiliary bearing system, such as a type employed by active magnetic bearing-supported machinery.

However, the utilization of auxiliary bearing systems designed for active magnetic bearing-supported machinery may present certain challenges as hydrostatic bearings operate on different principles and thus require different operation parameters. In the operation of active magnetic bearings, the rotor is levitated at zero speed. In scenarios where the auxiliary bearings are utilized, contact generally is made with the auxiliary bearings at operating speed as the rotor suddenly drops onto the auxiliary bearings with some impact force when the magnetic bearing fails. Thus, for magnetic bearing service, auxiliary bearing systems are typically used only on rare occasions, are subject to severe service when they are needed, and generally are designed with a limited service life.

With respect to hydrostatic bearings, and in the case of a horizontal rotor system, the auxiliary bearings generally support the rotor on every startup until the speed reaches a level such that the pressure differential builds and the gas bearings may take over support of the load. Furthermore, the auxiliary bearings must generally keep the center of the rotor close to the center of the bearing at all times, as the journal in an axially-fed hydrostatic bearing system does not "lift-off" as the pressure builds. Typically, the bearings are statically unstable at high eccentricity ratios and are incapable of generating sufficient lift. In addition to the foregoing, the auxiliary bearings also must generally support the rotor on every shutdown as well; however, the contact between rotor and auxiliary bearing typically occurs gradually and at a speed lower than full speed, so the duty on the bearing may be much less severe. In the case of a vertically mounted rotor, the radial bearings generally have no gravity load to locate the rotor at lower speeds when the pressure differential becomes small, and a design of the auxiliary bearing that centers the rotor and resists whirl is very advantageous.

Thus, in conjunction with a hydrostatic bearing, a conventional approach has been the utilization of an auxiliary bearing having a concentric rolling element bearing, such that a rotor positioned within the clearance of the concentric rolling element bearing, upon failure of the primary bearing, falls onto the inner surface of the inner ring (or a separate insert) of the concentric rolling element bearing. However, although such an auxiliary bearing may provide support, stiffness and damping in the vertical axis, it provides essentially no support, stiffness or damping in the horizontal direction. Therefore, such an auxiliary bearing is very poor at positioning the rotor horizontally. For a vertical rotor, a radial bearing of this type has no effect on the rotor until the orbit is so large that it touches the inner surface of the bearing. This results in high vibration and poor centering of the rotor.

There is a need, therefore, for an auxiliary bearing system capable of providing stable support when the bearing and seal combination cannot support the rotor loads independently and further capable of providing improved stiffness and damping in the horizontal direction for a horizontally-oriented rotor or providing stiffness and damping with reduced rotor motion for a vertically-oriented rotor. Further, there is a need for an auxiliary bearing system capable of hundreds of start/stop cycles without maintenance.

SUMMARY OF THE INVENTION

Embodiments of the disclosure may provide a rotor system for a rotating machine. The rotor system may include a rotating shaft, and a primary bearing configured to provide a bearing and seal combination. The primary bearing may include a stator portion defining a bore through which the rotating shaft extends, such that an annular clearance is defined between the stator portion and the rotating shaft extending therethrough when the primary bearing supports the rotating shaft. The rotor system may also include an auxiliary bearing. The auxiliary bearing may include a support structure extending around a circumference of the rotating shaft, such that an annular gap is defined between the support structure and the rotating shaft when the primary bearing supports the rotating shaft. The auxiliary bearing may also include a first pedestal extending radially-inward from the support structure, and first and second beams extending from opposite sides of the first pedestal in a plane perpendicular to an axis of the shaft. The auxiliary bearing may further include a first roller operatively coupled to the first beam, and a second roller operatively coupled to the second beam, such that the first and second rollers are configured to engage the shaft.

Embodiments of the disclosure may further provide a rotor system for a turbomachine. The rotor system may include a rotating shaft, and a hydrostatic bearing including a static portion defining a bore through which the rotating shaft extends such that an annular clearance is formed between the stator portion and the rotating shaft when the hydrostatic bearing supports the rotating shaft. The rotor system may also include an auxiliary bearing. The auxiliary bearing may include a support structure extending around a circumference of the rotating shaft, such that an annular gap is defined between the support structure and the rotating shaft when the hydrostatic bearing supports the rotating shaft, and the area of the annular gap is less than the area of the annular clearance when the hydrostatic bearing supports the rotating shaft. The auxiliary bearing may also include first and second pedestals extending radially-inward from the support structure, such that the second pedestal is axially-offset from the first pedestal with respect to the rotating shaft. The auxiliary bearing may further include first and second flexible beams extending from opposite sides of the first pedestal in a plane perpendicular to an axis of the rotating shaft, and third and fourth flexible beams extending from opposite sides of the second pedestal in a plane perpendicular to the axis of the rotating shaft, such that the third beam is axially-symmetric with the first beam and the fourth beam is axially-symmetric with the second beam. The auxiliary bearing may also include a first roller disposed between the first and third beams and adapted to engage the rotating shaft, and a second roller disposed between the second and fourth beams and adapted to engage the rotating shaft.

Embodiments of the disclosure may further provide a method for supporting a rotating shaft with an auxiliary bearing in a rotating machine. The method may include providing a pressure differential across a bearing and seal combination in the rotating machine, such that the bearing and seal combination is unable to support the rotating shaft. The method may also include engaging the rotating shaft with a first roller of the auxiliary bearing disposed at a first circumferential location, the first roller operatively coupled to and supported by a first beam of the auxiliary bearing that extends from a first side of a pedestal of the auxiliary bearing in a plane perpendicular to an axis of the rotating shaft. The method may further include engaging the rotating shaft with a second roller of the auxiliary bearing disposed at a second circumferential location, the second roller operatively coupled to and supported by a second beam of the auxiliary bearing that extends from a second side of the pedestal in the plane perpendicular to the axis of the rotating shaft. The method may also include rotating the first and second rollers in response to the rotation of the rotating shaft, such that the auxiliary bearing supports the rotating shaft.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 7:
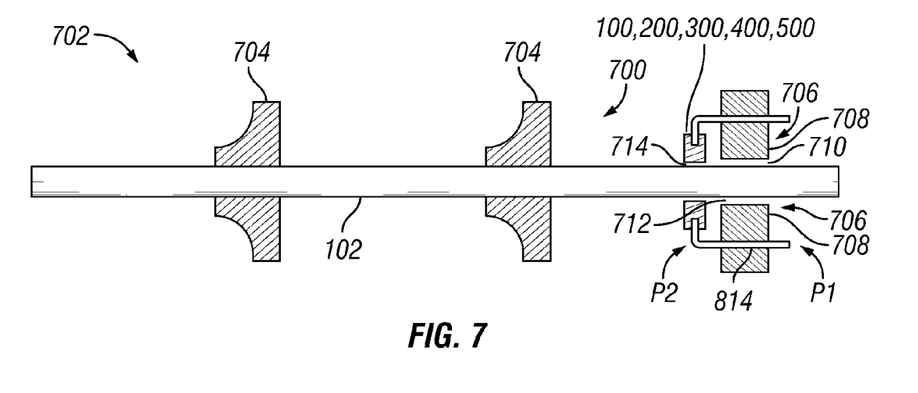
FIG. 7 illustrates an exemplary rotor system utilizing a primary hydrostatic bearing and an auxiliary bearing, according to one or more embodiments described.

FIG. 7 illustrates an exemplary rotor system 700 for a rotating machine 702 including a rotating shaft 102. The rotating machine 702 may be a turbomachine, such as a turbine or a compressor. The rotating machine 702 may have a single stage or have multiple stages, and correspondingly, may have one or more impellers 704. Each impeller 704 may be coupled to or integral with the rotating shaft 102. The rotating shaft 102 may be driven by a driver (not shown). The driver may be an electric motor, such as a permanent magnet motor. As will be appreciated, other embodiments may employ other types of electric motors, such as, but not limited to, synchronous, induction, brushed DC motors, etc. Further, the driver may be a hydraulic motor, an internal combustion engine, a gas turbine, or any other device capable of rotatably driving the rotating shaft 102 either directly or through a power train.

The rotor system 700 may further include one or more primary bearings 706. In an exemplary embodiment, the rotor system 700 includes a primary bearing 706 at each end (only one end shown in FIG. 7) of the rotating shaft 102 and configured to support the rotating shaft 102 during normal operation of the rotating machine 702. In an exemplary embodiment, the primary bearing 706 may be hydrostatic bearing forming a bearing and seal combination. For example, the hydrostatic bearing 706 may be a bearing and seal combination. The hydrostatic bearing 706 may include an approximately cylindrical stator 708 forming a bore 710 configured to receive the rotating shaft 102 therethrough. An annular clearance 712 may be defined between the cylindrical stator 708 of the hydrostatic bearing 706 and the rotating shaft 102 when disposed therethrough. The pressure drop of the process fluid across the annular clearance 712 may be utilized to obtain the function as the hydrostatic bearing 706.

Figure 1:
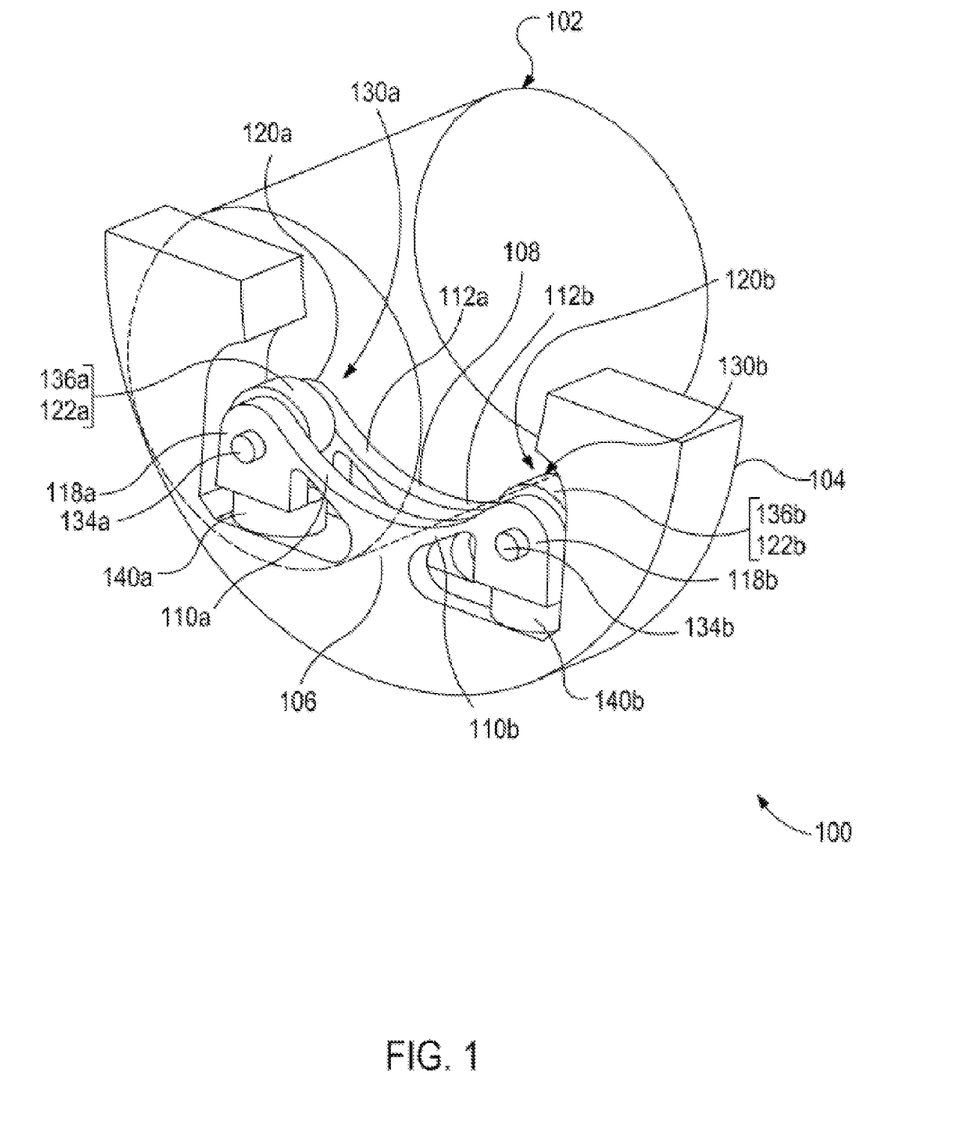
FIG. 1 illustrates an exemplary embodiment of an auxiliary bearing, according to one or more embodiments described.

As shown in FIG. 7 and in more detail in FIGS. 1-5, the rotor system 700 may further include one or more auxiliary bearings 100,200,300,400,500. FIG. 1 illustrates an exemplary embodiment of an auxiliary bearing 100. The exemplary auxiliary bearing 100 may be a planetary-type auxiliary bearing. Under normal operating conditions, the pressure differential allows for the hydrostatic bearing 706 to support the rotating shaft 102, and an annular or radial gap 714 exists between the rotating shaft 102 and the auxiliary bearing 100. Accordingly, the area of the annular gap 714 may be less than the area of the annular clearance 712 during normal operation. However, during start-up and shut-down, the pressure differential may not be large enough for the hydrostatic bearing 706 to support the rotating shaft 102, and as a result, the rotating shaft 102 will be supported by the auxiliary bearings 100,200,300,400,500. Moreover, during shut-down or the failing of the hydrostatic bearing 706 due to pressure loss, the rotating shaft 102 will drop down onto the auxiliary bearings 100,200,300,400,500. The auxiliary bearing 100 may be one of two or more auxiliary bearings that are positioned at axially-spaced locations along the shaft 102 including, but not limited to, opposing end portions of the shaft 102. In an exemplary embodiment, the auxiliary bearing 100 may be disposed inboard from the hydrostatic bearing 706.

The auxiliary bearing 100 may include an auxiliary bearing support structure 104 that extends at least partially around the circumference of the shaft 102. The support structure 104 may have one or more central pedestals 106, 108 (two are shown) coupled thereto or integrated therewith and extending radially-inward with respect to the support structure 104. In at least one embodiment, the pedestals 106, 108 may be disposed directly below the shaft 102 and may be axially-offset from one another. Cantilever beams 110a,b may extend from opposing sides of the first pedestal 106 in a plane perpendicular to an axis of the shaft 102. Likewise, cantilever beams 112a,b may extend from opposing sides of the second pedestal 108 in the plane perpendicular to the axis of the shaft 102. The first pedestal 106 and the beams 110a,b may be axially-symmetric with the second pedestal 108 and the beams 112a,b. Although FIG. 1 illustrates two opposing pedestals 106, 108, embodiments disclosed herein further contemplate a unitary pedestal structure (not shown) where the cantilever beams 110a,b, 112a,b extend separately from the unitary pedestal structure.

An end 118a,b of beams 110a,b, opposite the pedestal 106, may be suspended between the shaft 102 and the support structure 104. Likewise, an end 120a,b of beams 112a,b, opposite the pedestal 108, may be suspended between the shaft 102 and the support structure 104.

At least one roller 122a may be disposed at a first circumferential contact location 130a, with respect to the shaft 102, and operatively coupled to the beams 110a, 112a. Likewise, at least one roller 122b may be disposed at a second circumferential contact location 130b, with respect to the shaft 102, and operatively coupled to the beams 110b, 112b. Only two rollers 122a,b are shown in the auxiliary bearing 100 in FIG. 1, however, as may be appreciated, any number of rollers may be used. A first axle 134a may be coupled to the beams 110a, 112a and support the first roller 122a between the beams 110a, 112a, and a second axle 134b may be coupled to the beams 110b, 112b and support the second roller 122b between the beams 110b, 112b. In at least one embodiment, a cooling fluid may flow through the axles 134a,b to cool the rollers 122a,b, which may generate heat when in motion. In other embodiments, a passive system, such as a heat sink or heat pipe, may be employed to cool the rollers 122a,b.

The beams 110a,b and 112a,b may be flexible and/or elastic and configured to bend or deflect radially-outward when loads are applied. This allows the beams 110a,b, 112a,b and the rollers 122a,b to divide the load of the shaft 102 relatively evenly. Moreover, the axially-arrayed beams 110a,b, 112a,b may ensure that the rollers 122a,b maintain their orthogonal orientation relative to the shaft 102 when the load of the shaft 102 is applied.

The rollers 122a,b may include rolling element bearings, each having an inner race (not shown) coupled to the respective axles 134a,b, wherein the axles 134a,b and the inner races are both stationary. The rolling element bearings may also include a plurality of balls (not shown) disposed radially-outward from the inner race and adapted to spin or rotate within the rollers 122a,b. Each roller 122a,b may further include an outer race or outer surface 136a,b disposed radially-outward from the balls and adapted to engage and spin up with the shaft 102 when the shaft 102 drops onto the auxiliary bearing 100. In at least one embodiment, the outer surfaces 136a,b of the rollers 122a,b may be crowned to avoid edge loading and premature failure of the rollers 122a,b. In at least one embodiment, the outer surfaces 136a,b may include a hard coating or a solid lubricating coating, such as molybdenum disulfide or tungsten disulfide. The rollers 122a,b may be formed from a corrosion resistant material including, for example, Cronidur® 30, manufactured by the Barden Corporation of Danbury, Conn.

In at least one embodiment, the rollers 122a,b may include deep groove ball bearings, angular contact ball bearings, or needle or roller bearings, either operated dry for extreme environment use or lubricated with grease, depending on the application. In an embodiment employing angular contact ball bearings, each end of the angular contact ball bearings may form a radiused or tapered end to provide for axial positioning and thrust load capability. In another embodiment, the rollers 122a,b may include bushing-type sleeve bearings that may be solid-lubricated or oil film lubricated, i.e., with an oil ring. In yet another embodiment, the rollers 122a,b may include compliant surface gas bearings (such as foil bearings), porous gas bearings, or orifice-compensated gas bearings. In an embodiment employing porous gas bearings or orifice-compensated gas bearings, an auxiliary pressure gas source may be fluidly coupled to the porous gas bearings at least during start-up and shut-down of the rotor system 700.

One or more damping pads 140a,b may be disposed between the rollers 122a,b, respectively, and the support structure 104. The damping pads 140a,b may at least partially absorb the force from a drop of the shaft 102 and provide a degree of stiffness and/or damping to the auxiliary bearing 100. The damping pads 140a,b may include an elastomer such as polybutadiene, neoprene, Viton® manufactured by DuPont Performance Elastomers, a knitted metal mesh, such as those sold by Metal Textiles Corporation of Edison, N.J., or the like. The damping pads 140a,b may be sized using an impedance-matching algorithm. In at least one embodiment, the damping pads 140a,b may be similar to the damping pads disclosed in U.S. Pat. No. 5,521,448, the content of which is hereby incorporated by reference in its entirety to the extent that it is consistent with the present disclosure. It will be appreciated that the damping pads 140a,b may not be required in every application. Accordingly, they may be removed or otherwise omitted, and, in an embodiment, a small gap may be defined in their place to limit the radial deflection of the beams 110a,b and 112a,b. One or more preloaded bolt and spring arrangements (not shown) may be disposed proximate each damping pad 140a,b to maintain the damping pads 140a,b in a positive preloaded position.

Figure 8A:
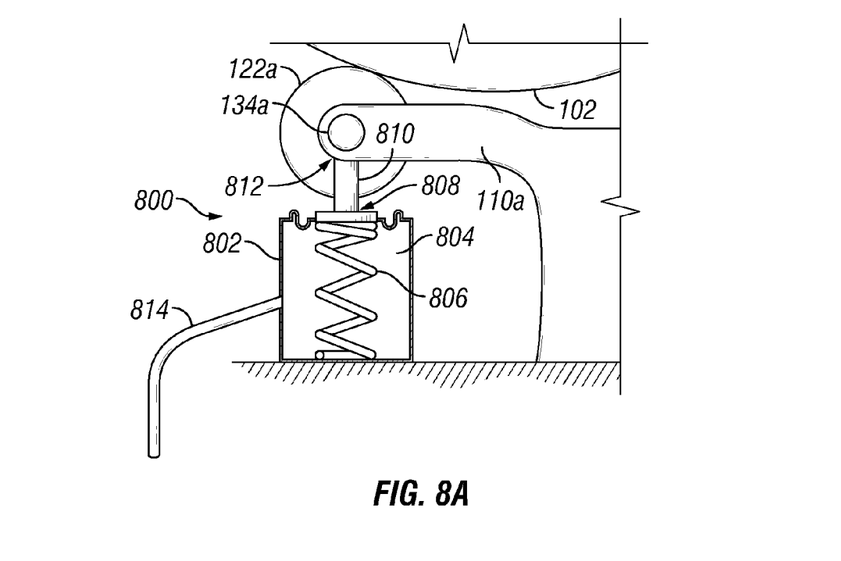
FIG. 8A illustrates an exemplary pneumatic actuator for an auxiliary bearing, according to one or more embodiments described.

In at least one embodiment, damping pads 140a,b may be omitted, and a respective pneumatic actuator 800, as illustrated in FIG. 8A, may be disposed in each of their places. Each pneumatic actuator 800 may be spring-loaded and may include a cylindrical housing 802 defining a chamber 804 therein. A spring 806 may be disposed within the cylindrical housing 802 and may be operatively coupled to or integral with a first end 808 of a piston 810. The piston 810 may include a second end 812, which may be operatively coupled to or integral with respective axle 134a,b. Each pneumatic actuator 800 may fluidly couple the high pressure side (P2) and low pressure side (P1) of the hydrostatic bearing 706 via a fluid passageway 814 as shown in FIG. 7. The fluid passageway 814 may be fluidly coupled to the chamber 804 of the pneumatic actuator 800 and may be utilized to vent high pressure fluid from the high pressure side (P2) of the hydrostatic bearing 706 to the low pressure side (P1) of the hydrostatic bearing 706. In another embodiment, a single pneumatic actuator 800 may be utilized in the auxiliary bearings 100,200,300,400,500.

In operation, each pneumatic actuator 800 may be used to retract the rollers 122a,b supported by respective axles 134a,b from the rotating shaft 102. In non-operating mode in which gas pressures in the compressor 702 are low, e.g., "settle-out," the spring 806 may be extended, thereby urging the rollers 122a,b against the rotating shaft 102. As the pressure in the compressor 702 increases, the pressure differential builds and the hydrostatic bearing 706 begins to operate and pick up load. Correspondingly, the pressure inside the chamber 804 of the pneumatic actuator 800 remains lower creating a larger pressure differential, thereby causing the spring 806 to be compressed and the piston 810 to retract from the rotating shaft 102. Thus, the rollers 122a,b may be removed from contact with the rotating shaft 102, such that the hydrostatic bearing 706 is operating in normal mode. However, a sudden drop in the pressure differential, e.g., shut-down or other large pressure loss, may cause the spring 806 to extend such that the rollers 122a,b contact the rotating shaft 102 and provide support for the rotating shaft 102.

Figure 8B:
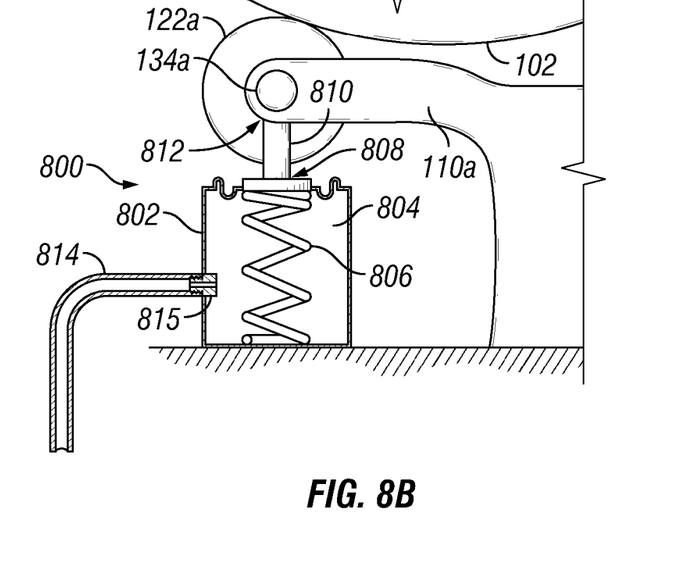
FIG. 8B illustrates an exemplary pneumatic actuator for an auxiliary bearing, the pneumatic actuator including a flow restrictor, according to one or more embodiments described.

In an exemplary embodiment illustrated in FIG. 8B, the pneumatic actuator 800 may include a flow restrictor 815 configured to regulate the rate at which fluid can enter and exit the chamber 804. By doing so, the resistance to fluid flow generates a change in force on the piston 810 that acts in a direction opposite to the velocity of motion of the piston 810 and therefore generates a damping force to control vibration of the rotor 102. This allows the actuator 800 to act as a damped support to the rotor 102 when the rotor is in contact with the rollers 122a,b.

Figure 8C:
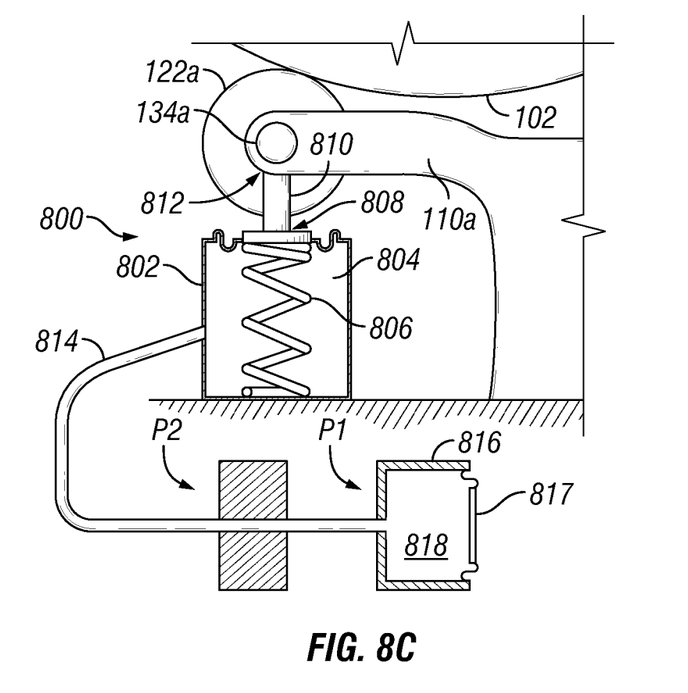
FIG. 8C illustrates an exemplary pneumatic actuator for an auxiliary bearing, the pneumatic actuator including a supply chamber, according to one or more embodiments described.

In an exemplary embodiment illustrated in FIG. 8C, the fluid passageway 814 may be connected to a supply chamber 816 on the low pressure side (P1). The supply chamber 816 may be sealed by a diaphragm 817 that is flexibly supported at its outer periphery to the supply chamber 816. The interior of the supply chamber 816 may include a gas or a liquid reservoir 818 provided to transmit pressure at the low pressure side (P1) to the actuator 800 during a sudden drop in the pressure differential.

The auxiliary bearing 100 may include a first section, e.g., lower half, and a second section, e.g., upper half, which may provide for ease of assembly and maintenance. For illustrative purposes, only the first section of the auxiliary bearing 100 is shown in FIG. 1. The second section may be a mirror image of the first section or differ from the first section, and therefore will not be described in detail. The circumferential contact location 130a,b of the rollers 122a,b may be tailored to specific design requirements. For example, the number of rollers in the second section may be reduced and the number of rollers 122a,b in the first half may be increased to account for an expected local load distribution due to the drop and impact of the shaft 102.

In at least one embodiment, the auxiliary bearing 100 may be rotated around the axis of the shaft 102 (not shown). For example, the auxiliary bearing 100 may be rotated about 90° around the axis of the shaft 102 such that the first section of the auxiliary bearing 100 is rotated to a left side of the shaft 102 and the second section of the auxiliary bearing 100 is rotated to a right side of the shaft 102. In this embodiment, the length of the beams 110a,b and 112a,b may be increased, thereby increasing the flexibility of the auxiliary bearing 100. In at least one embodiment, there may be three or more sets of pedestals 106, 108, beams 110a,b, 112a,b, and rollers 122a,b disposed circumferentially around the support structure 104 to support the shaft 102 after a drop in any radial direction.

In operation, when the hydrostatic bearing 706 cannot support the shaft 102, for example, during shut-down or start-up, the shaft 102 drops onto or remains, respectively, on the auxiliary bearing 100. During shut-down or a failure due to pressure loss, the shaft 102, which may be rotating at a high rotation speed, engages the outer surfaces 136a,b of the rollers 122a,b, which are stationary or slow rolling during normal operating conditions, i.e., when the hydrostatic bearing 706 is supporting the shaft 102. When the shaft 102 engages the rollers 122a,b, the rollers 122a,b spin up and rotate with the shaft 102. The weight of the shaft 102 may cause the flexible beams 110a,b, 112a,b and the rollers 122a,b to deflect radially-outward to centralize the shaft 102 and ensure relatively equal load sharing between the rollers 122a,b. The damping pads 140a,b may limit the radial deflection of the beams 110a,b, 112a,b and the rollers 122a,b. In at least one embodiment, rotation of the rollers 122a,b may generate a significant amount of heat that may be generally dissipated or otherwise regulated with a cooling fluid, i.e., oil, etc., flowing within the rollers 122a,b.

Figure 2:
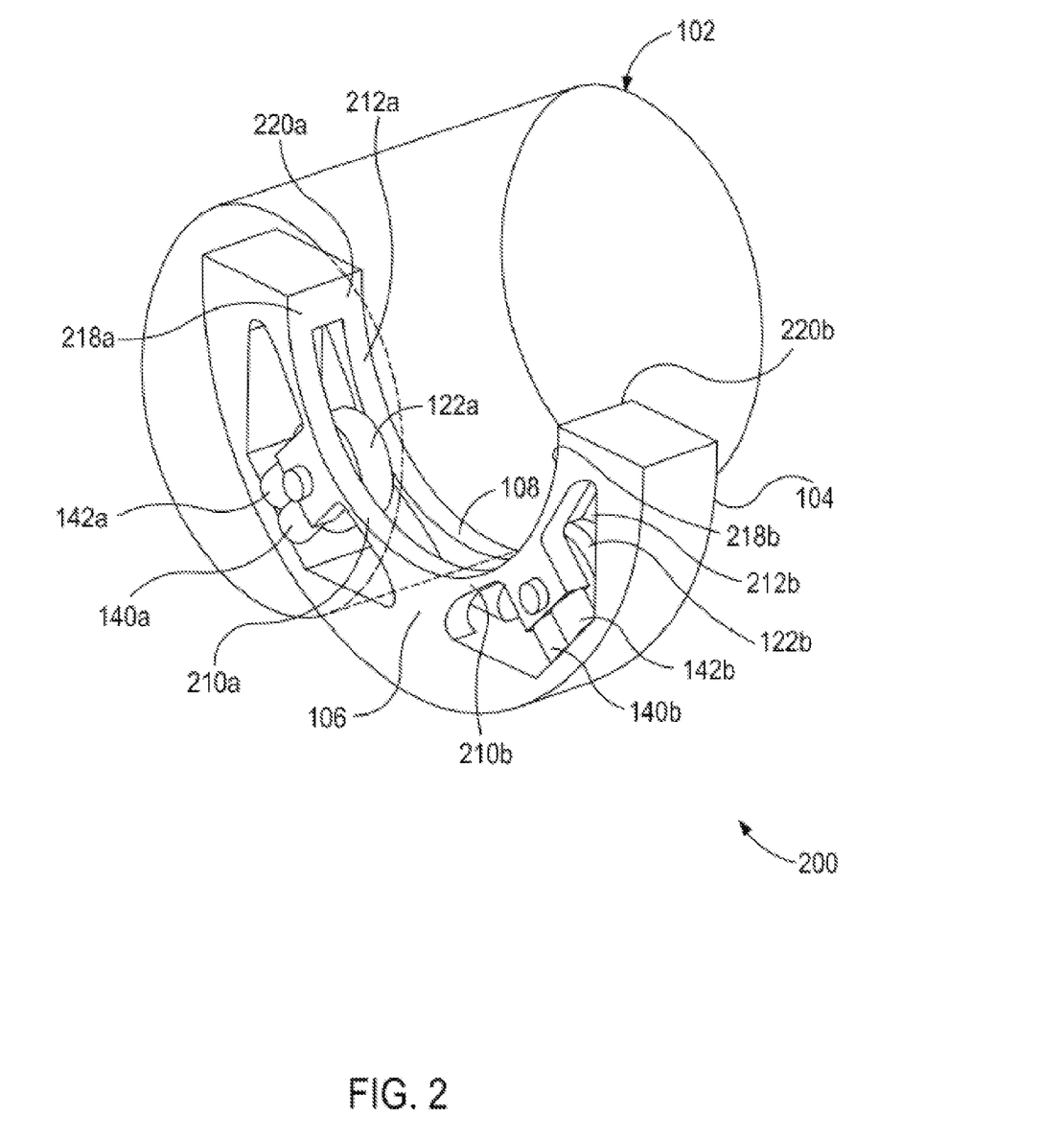
FIG. 2 illustrates another exemplary embodiment of an auxiliary bearing, according to one or more embodiments described.

FIG. 2 illustrates another exemplary embodiment of an auxiliary bearing 200, according to one or more embodiments described. The auxiliary bearing 200 illustrated in FIG. 2 is similar to the auxiliary bearing 100 depicted in FIG. 1, and like numerals are used to represent like elements. However, instead of having the beam ends 118a,b and 120a,b suspended between the shaft 102 and the support structure 104, as in FIG. 1, the beam ends 218a,b and 220a,b may be coupled to or integrated with the support structure 104, as shown in FIG. 2. Thus, the beams 210a,b and 212a,b are fixed-support beams, supported at both ends. As may be appreciated, the choice between the auxiliary bearing 100 having beams 110a,b, 112a,b with suspended ends 118a,b and 120a,b and the auxiliary bearing 200 having fixed support beams 210a,b, 212a,b may depend on the required stiffness, deflection, and/or stress of the particular application.

The first roller 122a may be disposed between the beams 210a, 212a at a point about halfway between the pedestals 106,108 and the ends 218a, 220a of beams 210a, 212a, respectively. Likewise, the second roller 122b may be disposed between beams 210b, 212b at a point about halfway between the pedestals 106,108 and the beam ends 218b, 220b. When the shaft 102 engages the rollers 122a,b, the beams 210a,b, 212a,b may be bend or deflect under the load of the shaft 102.

One or more damping pads 140a,142a (two are shown) may be disposed between the first roller 122a and the support structure 104, and one or more damping pads 140b,142b may be disposed between the second roller 122b and the support structure 104. For example, four damping pads may be disposed between each roller 122a,b and the support structure 104. However, as may be appreciated, the shape, size, number, and material of the damping pads 140a,b and 142a,b may vary depending on the application, without departing from the scope of the disclosure.

Figure 3:
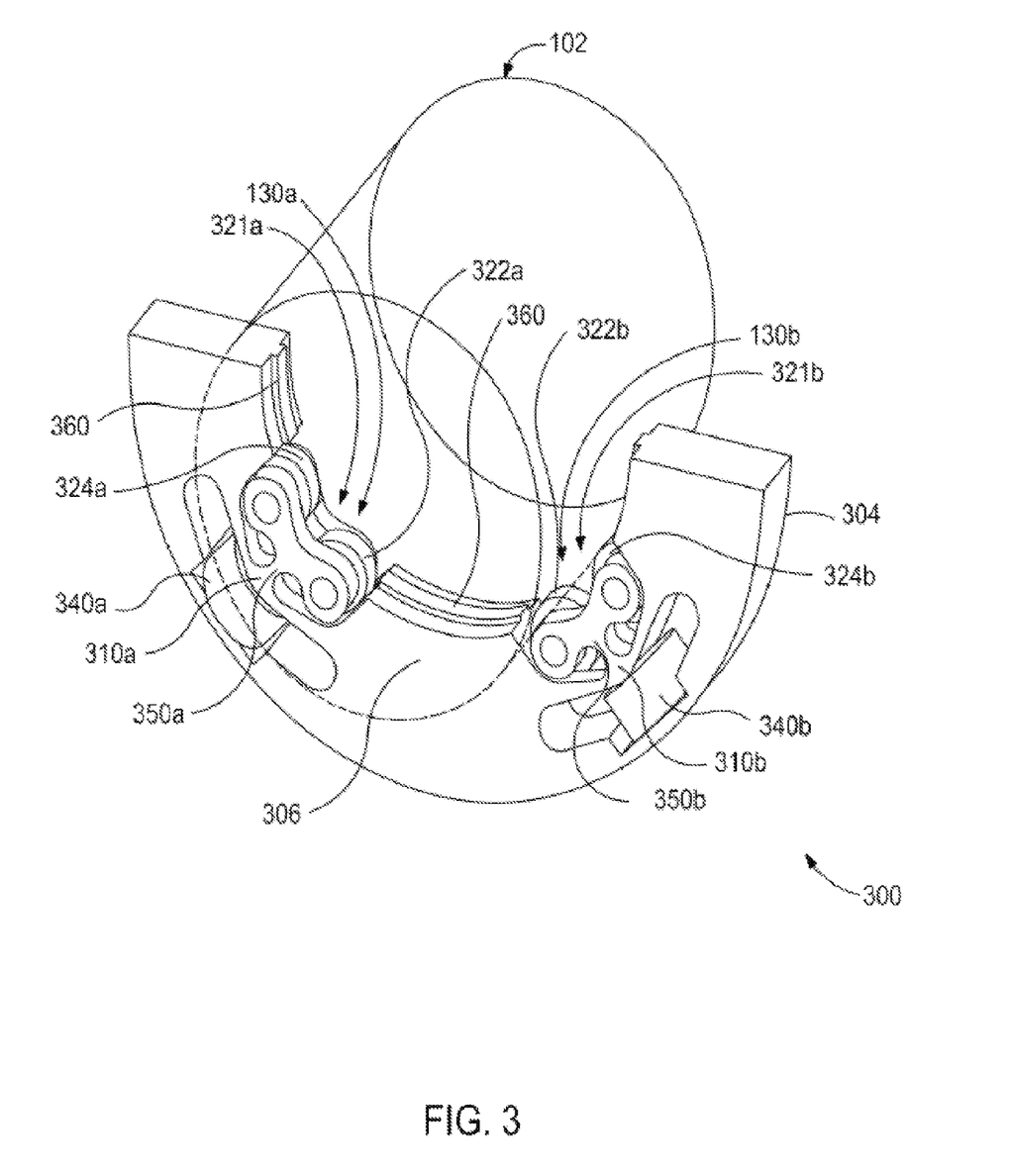
FIG. 3 illustrates another exemplary embodiment of an auxiliary bearing, according to one or more embodiments described.

FIG. 3 illustrates another exemplary embodiment of an auxiliary bearing 300, according to one or more embodiments described. The auxiliary bearing 300 illustrated in FIG. 3 is similar to the auxiliary bearings 100 and 200 depicted in FIGS. 1 and 2, respectively, and like numerals are used to represent like elements. However, instead of having a single roller 122a at the first circumferential contact location 130a and a single roller 122b at the second circumferential contact location 130b, the auxiliary bearing 300 may include a first double roller arrangement 321a at the first circumferential contact location 130a and a second double roller arrangement 321b at the second circumferential contact location 130b. The first double roller arrangement 321a may have two rollers 322a, 324a, and the second double roller arrangement 321b may have two rollers 322b, 324b. This allows rollers 322a, 324a to share the radial load at the first circumferential contact location 130a and rollers 322b, 324b to share the radial load at the second circumferential contact location 130b.

A first beam 310a may extend from a first side of a pedestal 306 and be coupled to or integrated with the support structure 304 distal the pedestal 306. Likewise, a second beam 310b may extend from a second side of the pedestal 306 and be coupled to or integrated with the support structure 304 distal the pedestal 306. In at least one embodiment, the first and second beams 310a,b may be replaced by two parallel beams (not shown), similar to the embodiments discussed with reference to FIG. 2. The beams 310a,b may be adapted to bend under the load of the shaft 102. As shown, the first circumferential contact location 130a is generally in the center of the first beam 310a, and the second circumferential contact location 130b is generally in the center of the second beam 310b.

The first double roller arrangement 321a may be operatively coupled to the first beam 310a through a first elastic pivot 350a which enables the first double roller arrangement 321a to flex slightly and facilitate load sharing between the rollers 322a, 324a. Likewise, the second double roller arrangement 321b may be operatively coupled to the second beam 310b through a second elastic pivot 350b which enables the second double roller arrangement 321b to flex slightly and facilitate load sharing between the rollers 322b, 324b. The elastic pivots 350a,b may also facilitate load sharing between the first and second double roller arrangements 321a,b. Damping pads 340a,b may be disposed behind the elastic pivots 350a,b, respectively, or the damping pads 340a,b may be omitted.

A static frame extension 360 may be integrated with and/or mounted on a radially-inner surface of the support structure 304. The static frame extension 360 may be in the plane of the support structure 304 and extend radially-inward therefrom. The static frame extension 360 may serve as a snubber to limit the overall movement of the rotor system 700 and to limit the maximum impact loading on the auxiliary bearing system 300 for the case of momentary radial overloading. The surfaces of the static frame extension 360 may be made of a different material than the support structure 304, such as a copper alloy, or other abradable materials. The surfaces may be coated with a dry lubricant, or an appropriate tribolic surface can be added if desired. The static frame extensions 360 are particularly advantageous for larger systems, or when severe shaft 102 movement scenarios are expected.

Figure 4:
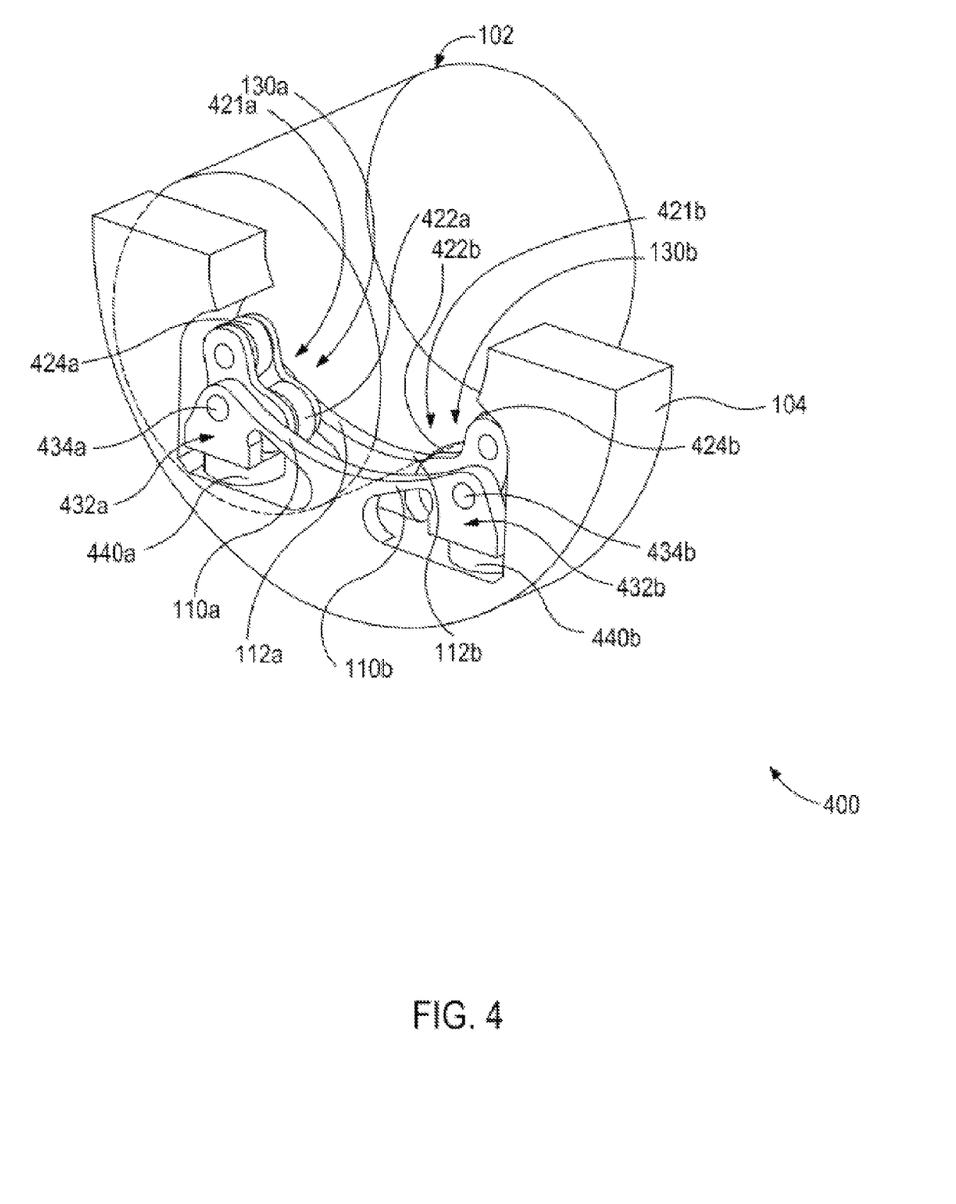
FIG. 4 illustrates another exemplary embodiment of an auxiliary bearing, according to one or more embodiments described.

FIG. 4 illustrates another exemplary embodiment of an auxiliary bearing 400, according to one or more embodiments described. The auxiliary bearing 400 illustrated in FIG. 4 is similar to the auxiliary bearing 100 depicted in FIG. 1, and like numerals are used to represent like elements. However, instead of having a single rollers 122a,b at the first and second circumferential contact locations 130a,b, respectively, the auxiliary bearing 400 may include a first movable frame 421a at the first circumferential contact location 130a and a second movable frame 421b at the second circumferential contact location 130b. The first movable frame 421a may include two rollers 422a, 424a, and the second movable frame 421b may also include two rollers 422b, 424b. The movable frames 421a,b may be supported by bushing-mounted axle systems 432a,b, respectively. The first bushing mounted axle system 432a may have an axle 434a coupled to beams 110a, 112a, similar to the arrangement in FIG. 1. Likewise, the second bushing mounted axle system 432b may have an axle 434b coupled to beams 110b, 112b. The flexible beams 110a,b, 112a,b and the movable frames 421a,b, which may pivot, may provide relatively equal load sharing between the first movable frame 421a and the second movable frame 421b. The arrangement may also provide relatively equal load sharing between the rollers 422a, 424a within the first movable frame 421a and between the rollers 422b, 424b within the second movable frame 421b. Damping pads 440a,b may be disposed between the movable frames 421a,b and the support structure 104 to limit the radial deflection of the beams 110a, b, 112a,b and the movable frames 421a,b.

Figure 5:
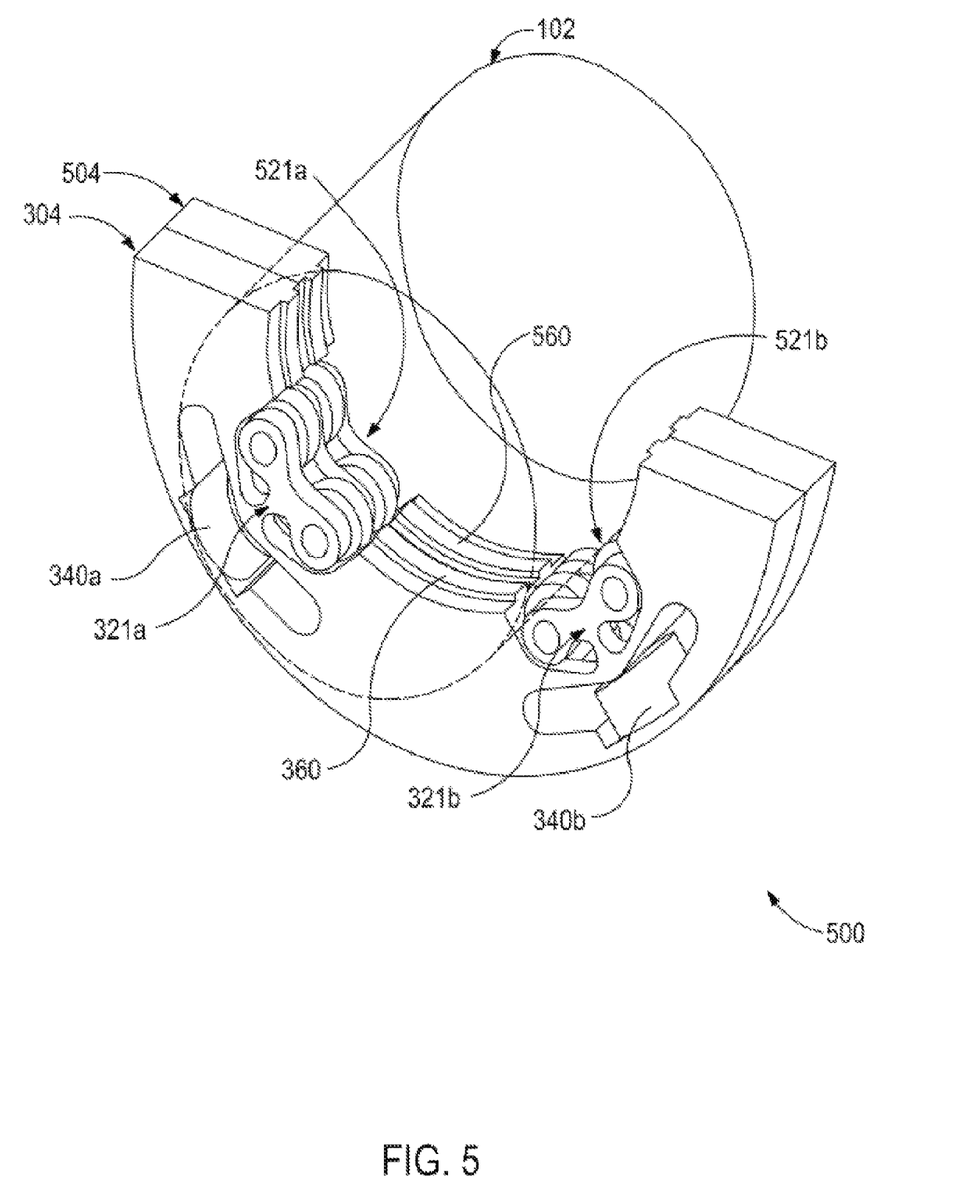
FIG. 5 illustrates another exemplary embodiment of an auxiliary bearing, according to one or more embodiments described.

FIG. 5 illustrates another exemplary embodiment of an auxiliary bearing 500, according to one or more embodiments described. FIG. 5 is similar to the auxiliary bearing 300 depicted in FIG. 3, and like numerals are used to represent like elements. The auxiliary bearing 500 may include first and second support structures 304,504 disposed axially-adjacent to one another. In at least one embodiment, each of the first and second support structures 304, 504 may be substantially similar to the support structure 104 depicted in FIG. 1, the support structure 104 depicted in FIG. 2, the support structure 304 depicted in FIG. 3, the support structure 104 depicted in FIG. 4, or the like. As shown, the second support structure 504 includes a third double roller arrangement 521a disposed axially-adjacent the first double roller arrangement 321a of the first support structure 304. The second support structure 504 also includes a fourth double roller arrangement 521b disposed axially-adjacent the second double roller arrangement 321b of the first support structure 304. By including a second support structure 504 having roller arrangements 521a,b that are axially-offset from the roller arrangements 321a,b of the first support structure 304, the load capacity of the auxiliary bearing 500 may generally be doubled.

The second bearing structure 504 may further include a second static frame extension 560 disposed axially-adjacent the first static frame extension 360. The second bearing structure 504 may also include additional damping pads (not shown) disposed axially-adjacent the damping pads 340a,b.

The auxiliary bearings 100,200,300,400,500 described herein may be more stable than conventional auxiliary bearings where the shaft 102 drops onto the inner races of ball or roller bearings. This is due to a combination of the two-point contact, low inertia rollers, and the low frictional forces from the smaller-sized bearings supporting the rollers. The embodiments described herein may be especially advantageous when used in scaled up applications supporting larger, heavier shafts 102, as the circumferential load locations 130a,b of the rollers outside the shaft 102 allows the individual bearings in each roller to be relatively small, even for larger applications.

Figure 6:
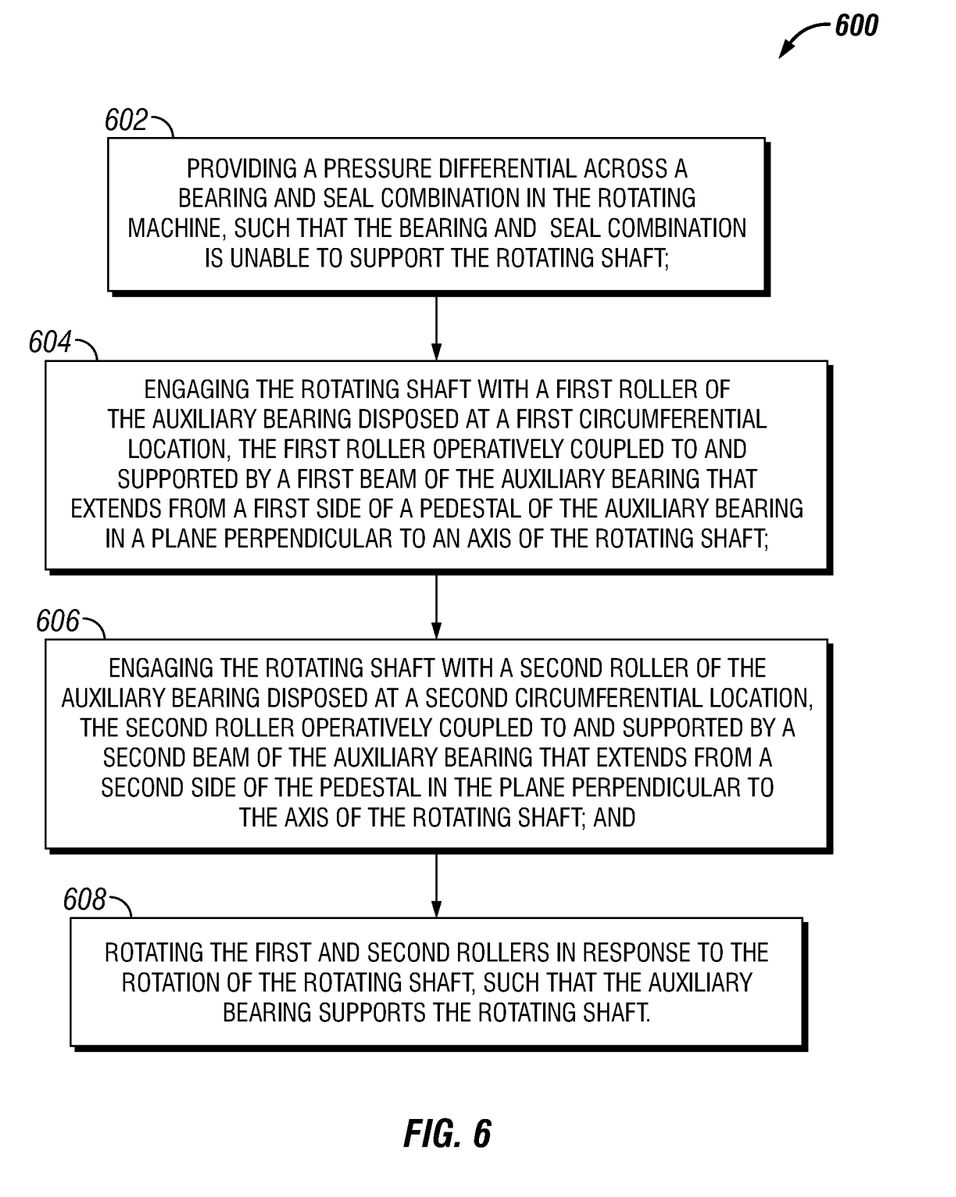
FIG. 6 is a flowchart of a method for supporting a rotating shaft with an auxiliary bearing in a rotating machine, according to one or more embodiments described.

FIG. 6 is a flowchart of a method 600 for supporting a rotating shaft with an auxiliary bearing in a rotating machine, according to one or more embodiments described. The method 600 may include providing a pressure differential across a bearing and seal combination in the rotating machine, such that the bearing and seal combination is unable to support the rotating shaft, as shown at 602. The method 600 may also include engaging the rotating shaft with a first roller of the auxiliary bearing disposed at a first circumferential location, the first roller operatively coupled to and supported by a first beam of the auxiliary bearing that extends from a first side of a pedestal of the auxiliary bearing in a plane perpendicular to an axis of the rotating shaft, as at 604. The first roller may be operatively coupled to and supported by a first beam. The first beam may extend from a first side of a pedestal in a direction perpendicular to the axis of the shaft.

The method 600 may also include engaging the rotating shaft with a second roller of the auxiliary bearing disposed at a second circumferential location, the second roller operatively coupled to and supported by a second beam of the auxiliary bearing that extends from a second side of the pedestal in the plane perpendicular to the axis of the rotating shaft, as at 606. The second roller may be operatively coupled to and supported by a second beam. The second beam may extend from a second side of the pedestal in a direction perpendicular to the shaft. The method 600 may further include rotating the first and second rollers in response to the rotation of the rotating shaft, such that the auxiliary bearing supports the rotating shaft, as shown at 608.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A rotor system for a rotating machine, comprising:
   a rotating shaft;
   a primary bearing configured to provide a bearing and seal combination, the primary bearing comprising a stator portion defining a bore through which the rotating shaft extends, such that an annular clearance is defined between the stator portion and the rotating shaft extending therethrough when the primary bearing supports the rotating shaft; and
   an auxiliary bearing, comprising:
      a support structure extending around a circumference of the rotating shaft, such that an annular gap is defined between the support structure and the rotating shaft when the primary bearing supports the rotating shaft;
      a first pedestal extending radially-inward from the support structure;
      first and second beams extending from opposite sides of the first pedestal in a plane perpendicular to an axis of the rotating shaft;
      a first roller operatively coupled to the first beam; and
      a second roller operatively coupled to the second beam, wherein the first and second rollers are configured to engage the rotating shaft.

2. The rotor system of claim 1, wherein ends of the first and second beams, distal the first pedestal, are suspended between the rotating shaft and the support structure.

3. The rotor system of claim 2, wherein the first roller is disposed proximate the end of the first beam and the second roller is disposed proximate the end of the second beam.

4. The rotor system of claim 2, wherein the auxiliary bearing further comprises:
   a first movable frame operatively coupled to the end of the first beam, wherein the first roller comprises two rollers, each disposed within the first movable frame; and
   a second movable frame operatively coupled to the end of the second beam, wherein the second roller comprises two rollers, each disposed within the second movable frame.

5. The rotor system of claim 1, wherein ends of the first and second beams, opposite the first pedestal, are coupled to or integrated with the support structure.

6. The rotor system of claim 5, wherein the first roller is disposed centrally between the first pedestal and the end of the first beam and the second roller is disposed centrally between the first pedestal and the end of the second beam.

7. The rotor system of claim 5, wherein the auxiliary bearing further comprises:

a first double roller arrangement operatively coupled to the first beam, wherein the first roller comprises two rollers, each disposed within the first double roller arrangement; and a second double roller arrangement operatively coupled to the second beam, wherein the second roller comprises two rollers, each disposed within the second double roller arrangement.

8. The rotor system of claim 7, wherein the auxiliary bearing further comprises:

a first elastic pivot disposed between the first double roller arrangement and the first beam; and a second elastic pivot disposed between the second double roller arrangement and the second beam.

9. The rotor system of claim 1, wherein the auxiliary bearing further comprises:

a first damping pad disposed between the first roller and the support structure; and a second damping pad disposed between the second roller and the support structure.

10. The rotor system of claim 1, wherein the auxiliary bearing further comprises a pneumatic actuator configured to actuate at least one of the first and second rollers in response to a change in pressure in the rotor system.

11. The rotor system of claim 1, wherein the auxiliary bearing further comprises:

a third roller disposed axially-adjacent the first roller; and a fourth roller disposed axially-adjacent the second roller.

12. A rotor system for a turbomachine, comprising:

a rotating shaft;

a hydrostatic bearing comprising a static portion defining a bore through which the rotating shaft extends such that an annular clearance is formed between the stator portion and the rotating shaft when the hydrostatic bearing supports the rotating shaft;

an auxiliary bearing, comprising:

a support structure extending around a circumference of the rotating shaft, such that an annular gap is defined between the support structure and the rotating shaft when the hydrostatic bearing supports the rotating shaft, and the area of the annular gap is less than the area of the annular clearance when the hydrostatic bearing supports the rotating shaft;

first and second pedestals extending radially-inward from the support structure, wherein the second pedestal is axially-offset from the first pedestal with respect to the rotating shaft;

first and second flexible beams extending from opposite sides of the first pedestal in a plane perpendicular to an axis of the rotating shaft;

third and fourth flexible beams extending from opposite sides of the second pedestal in a plane perpendicular to the axis of the rotating shaft, wherein the third beam is axially-symmetric with the first beam and the fourth beam is axially-symmetric with the second beam;

a first roller disposed between the first and third beams and adapted to engage the rotating shaft; and a second roller disposed between the second and fourth beams and adapted to engage the rotating shaft.

13. The rotor system of claim 12, wherein:

ends of the first and second beams, distal the first pedestal, are suspended between the rotating shaft and the support structure, and ends of the third and fourth beams, distal the second pedestal, are suspended between the rotating shaft and the support structure.

14. The rotor system of claim 13, wherein the auxiliary bearing further comprises:

a first axle coupled to the first and third beams proximate the ends of the first and third beams, the first axle adapted to support the first roller between the first and third beams; and a second axle coupled to the second and fourth beams proximate the ends of the second and fourth beams, the second axle adapted to support the second roller between the second and fourth beams.

15. The rotor system of claim 13, wherein the auxiliary bearing further comprises:

a first movable frame coupled to and disposed between the first and third beams proximate the ends of the first and third beams, wherein the first roller comprises two rollers, each disposed within the first movable frame; and a second movable frame coupled to and disposed between the second and fourth beams proximate the ends of the second and fourth beams, wherein the second roller comprises two rollers, each disposed within the second movable frame.

16. The rotor system of claim 12, wherein:

ends of the first and second beams, distal the first pedestal, are coupled to or integrated with the support structure; and ends of the third and fourth beams, distal the second pedestal, are coupled to or integrated with the support structure.

17. The rotor system of claim 16, wherein:

the first roller is disposed between the first and third beams at a first circumferential location; and the second roller is disposed between the second and fourth beams at a second circumferential location.

18. A method for supporting a rotating shaft with an auxiliary bearing in a rotating machine, comprising:

providing a pressure differential across a bearing and seal combination in the rotating machine, such that the bearing and seal combination is unable to support the rotating shaft;

engaging the rotating shaft with a first roller of the auxiliary bearing disposed at a first circumferential location, the first roller operatively coupled to and supported by a first beam of the auxiliary bearing that extends from a first side of a pedestal of the auxiliary bearing in a plane perpendicular to an axis of the rotating shaft;

engaging the rotating shaft with a second roller of the auxiliary bearing disposed at a second circumferential location, the second roller operatively coupled to and supported by a second beam of the auxiliary bearing that extends from a second side of the pedestal in the plane perpendicular to the axis of the rotating shaft; and rotating the first and second rollers in response to the rotation of the rotating shaft, such that the auxiliary bearing supports the rotating shaft.

19. The method of claim 18, further comprising:

bending the first and second beams in response to a weight of the rotating shaft; and damping the bending of the first and second beams with first and second damping pads, respectively.

20. The method of claim 18, further comprising actuating a pneumatic actuator such that the rotating shaft engages with the first roller and the second roller.

* * * * *